(12) United States Patent
Arnold et al.

(10) Patent No.: US 6,347,001 B1
(45) Date of Patent: Feb. 12, 2002

(54) FREE-SPACE LASER COMMUNICATION SYSTEM HAVING SIX AXES OF MOVEMENT

(75) Inventors: Robert Arnold, Escondido; Richard G. Trissel, Cardiff; Scott Bloom, Encinitas, all of CA (US)

(73) Assignee: Trex Communications Corporation, San Diego, CA (US)

( * ) Notice: Subject to any disclaimer, the term of this patent is extended or adjusted under 35 U.S.C. 154(b) by 0 days.

(21) Appl. No.: 09/185,872

(22) Filed: Nov. 3, 1998

(51) Int. Cl.[7] .............................................. H04B 10/00
(52) U.S. Cl. ....................... 359/159; 359/152; 359/172; 359/193
(58) Field of Search ................................. 359/159, 154, 359/152, 172, 189, 193

(56) References Cited

U.S. PATENT DOCUMENTS

| | | | | |
|---|---|---|---|---|
| 5,347,387 A | * | 9/1994 | Rice ............................ | 359/152 |
| 5,390,040 A | * | 2/1995 | Mayeux ....................... | 359/152 |
| 5,592,320 A | * | 1/1997 | Wissinger ................... | 359/159 |
| 5,710,652 A | | 1/1998 | Bloom et al. ................ | 359/152 |
| 5,731,585 A | * | 3/1998 | Menders et al. ............. | 250/382 |
| 5,754,323 A | * | 5/1998 | Rivers et al. ................ | 359/152 |
| 5,777,768 A | * | 7/1998 | Korevaar ..................... | 359/172 |
| 5,790,291 A | * | 8/1998 | Britz ........................... | 359/159 |
| 5,801,866 A | * | 9/1998 | Chan et al. .................. | 359/172 |
| 6,091,528 A | * | 7/2000 | Kanda ......................... | 359/159 |
| 6,151,340 A | * | 11/2000 | Rivers ......................... | 372/32 |

* cited by examiner

Primary Examiner—Thomas Mullen
(74) Attorney, Agent, or Firm—Fish & Richardson P.C.

(57) ABSTRACT

A free-space laser communication system having six axes of movement. The system includes a fine tracking and acquisition system comprising a low inertia steering mirror having two axes of movement which points the communication laser transmission optical apertures separately from the optical apertures for the beacon laser, a coarse tracker, and a communication receiver. A fine tracking centroider and the communication lasers have the steerable mirror in common, and thus do not experience any alignment error that might arise from use of a separate deflecting element for each. The fine tracking and acquisition system is preferably mounted on a gimbal having two axes of movement, and the gimbal in turn is preferably mounted in a housing having two axes of movement.

27 Claims, 6 Drawing Sheets

FREE-SPACE LASER COMMUNICATION SYSTEM HAVING SIX AXES OF MOVEMENT

BACKGROUND

1. Technical Field

This invention relates to free-space laser communication systems, and more particularly to a free-space laser communication system having at least two communicating transceivers.

2. Background Information

Free-space laser communication systems transmit and receive information by means of a light beam that propagates through space or the atmosphere. Such laser systems gain their principle advantages over radio frequency based broadcast systems by being highly-directional and more difficult to jam. Compared to microwave-based systems, such laser systems usually have greater bandwidth, lower input power, smaller size and less weight. One reason a laser communication source requires less radiated power is because the angular radiated laser beam divergence is much smaller than a microwave beam.

When used for space-based, air-to-air or air-to-ground communications, free-space laser communication systems pose a number of challenging problems. One such problem is the fact that having a smaller beam divergence requires greater accuracy in pointing the laser beam. Microwave beam divergence is typically on the order of milliradians whereas laser beam divergence is generally less than 0.1 milliradians. This characteristic requires pointing accuracies for laser beams on the order of 1 to 10 microradians.

Accordingly, the first step in establishing communication for two laser communication terminals is for each terminal to acquire and track the other terminal. Typically such laser communication terminals will include a tracking beacon, a beacon receiver, and a communication transceiver, which are referred to as optical apertures. The transceiver optical aperture generally is mounted on a gimbaled platform having at least two orthogonal axes of freedom and which has been stabilized against base motion. The optical apertures are optically aligned with each other to what is called the system boresight.

The beacon laser of each terminal radiates a signal with much larger beam divergence than the signal of a separate communication laser, thus providing a source to acquire and track. This source must be viewable with good signal strength in the presence of other light, such as sky light, sunlight, starlight, moon light, or light reflected from the earth and other objects.

The acquisition and tracking system of each of a pair of laser communication terminals must be able to initially point the transmitting and receiving apertures of each terminal as close as possible to the direction of the other terminal.

FIG. 1 is a stylized diagram showing two vehicles communicating by means of a free-space laser communication system. A first vehicle 1 (e.g., an airplane) has a gimbal-mounted host laser communication terminal 2 mounted so as to be able to "see" a similarly mounted target laser communication terminal 3 on a second vehicle 4 (e.g., an airplane). The host terminal 2 includes a pointing system, a coarse acquisition and tracking system for generating a large field of view (FOV) "footprint" 5 to illuminate the target terminal 3, and a fine acquisition and tracking system for generating a smaller "footprint" 6 to more precisely illuminate the target.

Certain aspects of the system shown in FIG. 1 are disclosed in U.S. Pat. No. 5,710,652, entitled "Laser Communication Transceiver and System" and U.S. Pat. No. 5,801,866, entitled "Laser Communication Device" and U.S. patent application Ser. No. 08/221,527, filed Apr. 1, 1994, entitled "Point-to-Point Laser Communication Device" (now U.S. Pat. No. 5,754,323); [Ser. No. 08/199,115, filed Feb. 22, 1994, entitled "Laser Communication Transceiver and System";] and Ser. No. 07/935,899, filed Aug. 27, 1992, entitled "Voigt Filter" (now U.S. Pat. No. 5,731,585). Each of the above references is incorporated herein by reference.

FIG. 2 is a stylized diagram showing the angular field of view (FOV) 7 for the optical apertures of the target laser communication terminal 3 on the second vehicle 4 and the angular FOV 5 of the beacon beam from the transmitting host laser communication terminal 2. Each laser communication terminal must be able to initially point its transmitting and receiving optical apertures as close as possible to the direction of the opposite, target terminal. The beacon beam 5 from the host terminal 2 of the first vehicle 1 must provide a large footprint 5 at the receiving target terminal 3 to give the greatest probability of illuminating the target terminal 3. The target terminal sensor should have a large angular field of view 7 to improve the probability of seeing the host terminal's beacon beam on the first "look". This will reduce the amount of searching time and the uncertainty in establishing the communication link. However, if the beacon beam divergence is made too large, the intensity of the received beacon signal may be so low that the tracking signal caused by the received beacon signal is obscured by system electronic noise and other illuminating light sources.

The platform on which each terminal is mounted must provide a means to stabilize the pointing of the transmitting and receiving optical apertures against angular disturbances of the base mount. The base mount could include a vehicle, such as an aircraft or space platform, which has a significant amount of angular motion which would cause pointing errors for the optical apertures. The ideal method of stabilization would be a totally frictionless mount which has freedom to rotate in two orthogonal directions. If a frictionless mount were possible, then system inertia would cause each terminal to stay pointed in the same direction in the presence of angular disturbances to the base mount. In practice, friction couples base motion to the optical apertures of a terminal, causing angular motion. Such angular motion should be removed with a servo system which both senses and provides opposing torques to stabilize against the base motion.

The frequency of base motion disturbances can vary widely. Aircraft often have base motion disturbances at propulsion system frequencies or some multiple of these frequencies. A military tank would have disturbances at the frequencies of the engine rotation. These base motion disturbances can cause large pointing errors in a laser communication system. The terminal servo system must sense these disturbances and stabilize the base mount of the terminal. In general, the servo system must have a frequency response sufficiently high to compensate for the highest frequency components of base motion that contribute to producing pointing error.

The tracking system also must be able to sense angular motion of a terminal and provide pointing correction. The transmitter should be pointed with greater precision than the receiver of a laser terminal, since the beam divergence angle of the transmitter is much smaller than the receiver's acceptance angle. The precision of pointing the communication laser beam is preferably a fraction of its beam divergence angle that is sufficiently small so that the received power will vary at the receiver as the beam jitters due to the exponential decay in the beam intensity from its central maximum to its edge. The system is usually configured to maintain the beam power density equal to or above one half of its maximum power density. This ensures that the received communication signal is at least one half of the maximum transmitted power density that could be received during normal motion of the transceivers and in the presence of base angular vibration. In general, the angular tracking rates are small when terminals are separated by large distances. However, satellite to satellite tracking rates can be quite large for some systems, and ground to air tracking rates can be large if smaller distances are involved.

To provide tracking, a beacon receiver of terminal will image an incoming beacon beam onto a pixel-imaging device of what is commonly referred to as a "centroider". The centroider provides an error signal which is directly proportional to the angular difference between the boresight of the receiving terminal and the line of sight to the opposite transceiver. The error signal is amplified and filtered and then applied to gimbal drive motors or actuators to position the optical apertures of the receiving terminal such that the error signal is reduced to a minimum. For a free-space laser communication system with one or both terminals mounted on moving platforms to achieve a long range up to or greater than 500 km and a high data rate up to or greater than 1 GBPS, the communication laser beam must have a very small beam divergence angle in order to achieve the power density needed at the receiving terminal. This requires great precision in pointing because any errors greater than a desired beam divergence (e.g., the half angle beam divergence) would cause the footprint of the transmitted laser beam to miss the receiving aperture.

Some conventional designs use a common aperture configuration to achieve the above precision pointing. The transmitted communication laser beam is transmitted through the same aperture for receiving the beacon signal. Since the received beacon beam signal is used for determining the pointing direction, both apertures may be configured to have the same optical layout by using the same optical elements. This ensures that the communication laser beam is pointed in exactly the same direction as the received beacon signal. Such common aperture configuration also significantly reduces or minimizes any misalignment caused by temperature expansion, mechanical vibration or long-term drift of the mechanical misalignment.

One limitation of the common aperture configuration is the high background noise due to sharing of the same optical elements by a high power light source, the communication laser beam, and a sensitive receiver. Reflection or scattering of light from the optical surfaces caused by, for example, surface irregularities, optical coatings, optical element voids/inclusions, or accumulated particulate matter on the surfaces, can increase the background noise of the receiver. In a typical system, the sensitivity of the receiver is on the order of nanowatts while the transmitted power is many orders of magnitude greater (e.g., a fraction of a watt which is approximately $10^8$ greater than the receiver sensitivity). Such high background noise essentially decreases the allowable maximum separation between the two transceivers, thus undesirably reducing the communication range of the system.

Therefore, a need exists for improving accuracy of tracking and pointing in presence of the base motion and for increasing the transceiver range for such a free-space laser communication system. One aspect of the present invention is to provide a system to meet such need.

SUMMARY

The invention is embedded in a free-space laser communication system having a fine tracking and acquisition system with six axes of movement. The tracking and acquisition system includes a low inertia steerable mirror having two axes of movement which points the communication laser transmission optical apertures separately from the optical apertures for the beacon laser, coarse tracker, and communication receiver of the system. A fine tracking receiver centroider and the communication lasers share a common steerable mirror to substantially reduce or eliminate any alignment error that might arise from use of a separate deflecting element for each. The separate apertures for the communication laser the communication receiver significantly reduces the amount of background light received by the communication receiver from its communication transmitter. The system is configured so that the steering mirror, the received beacon and the transmitted lasers use different regions of the steering mirror for reflection to prevent light from the transmitted laser from entering the fine tracking receiver. The fine tracking and acquisition system is preferably mounted on a gimbal having two axes of movement, and the gimbal in turn is preferably mounted in a housing having two axes of movement.

One embodiment of a free-space laser communication system having six axes of movement, includes: a housing having two axes of movement; a gimbal mounted within the housing, the gimbal having two axes of movement; a free-space laser communication transceiver mounted on the gimbal. The transceiver includes a centroiding system for determining an aiming point for the free-space laser communication system; a steering mirror for directing an incoming beacon beam to the centroiding system, the steering mirror having two axes of movement; a feedback control for aiming the steering mirror at the aiming point determined by the centroiding system; and at least one communication laser beam directed at the steering mirror and thereby directed at the aiming point.

The free-space laser communication system may include a fine acquisition and tracking system which comprises: a centroiding system for determining an aiming point for the free-space laser communication system; a steering mirror for directing an incoming beacon beam to the centroiding system; a feedback control for aiming the steering mirror at the aiming point determined by the centroiding system; at least one communication laser beam directed at the steering mirror and thereby directed at the aiming point.

One implementation of the fine acquisition and tracking system has a control bandwidth in excess of 400 Hz, which is 6 to 8 times the bandwidth that can be achieved with only a mechanical gimbal aperture stabilization system. The invention addresses the high bandwidth stabilization and tracking requirements of a free-space laser communication system capable of long range (e.g., 500 km) and high data rates (e.g., >1 GBPS) and with one or both laser terminals mounted on moving platforms.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference numbers and designations in the various drawings indicate like elements.

DETAILED DESCRIPTION

A laser communication device may include transmitting units to produce a wide FOV beacon beam for coarse tracking, a narrow FOV beacon beam for fine tracking, and at least one laser communication beam for transmitting information. Accordingly, such a laser communication device may having a number of receiving units, including a coarse-tracking receiver for receiving a wide FOV beacon beam, a fine-tracking receiver for receiving a narrow FOV beam, and a data receiver for receiving a communication beam, from another communication device. Each optical aperture (i.e., a transmitting unit or a receiving unit) is adjustable to a desired orientation for proper operation. In a preferred embodiment, at least four axes of movement are implemented for each optical aperture. Six axes of movement may be more preferably used in directing certain optical apertures, such as the fine-tracking receiver and the transmitting unit for producing the communication laser beam, to improve the tracking accuracy and reliability in data transmission.

One embodiment of the laser communication device integrates all optical apertures on a common optical platform. Two steering members, a turret with two axes of rotation and a gimbal assembly with another two axes of rotation, are engaged and coupled with each other to provide four axes of rotation for the optical platform. The optical platform is mounted to the gimbal assembly and the gimbal assembly is mounted within the turret so that movement of the turret moves both the gimbal assembly and the optical platform to provide a coarse adjustment in the orientation of the optical platform. Movement of the gimbal assembly further provides a fine adjustment in the orientation of the optical platform. These features are now described in detail with reference to FIGS. 3 and 4.

Figure 1:
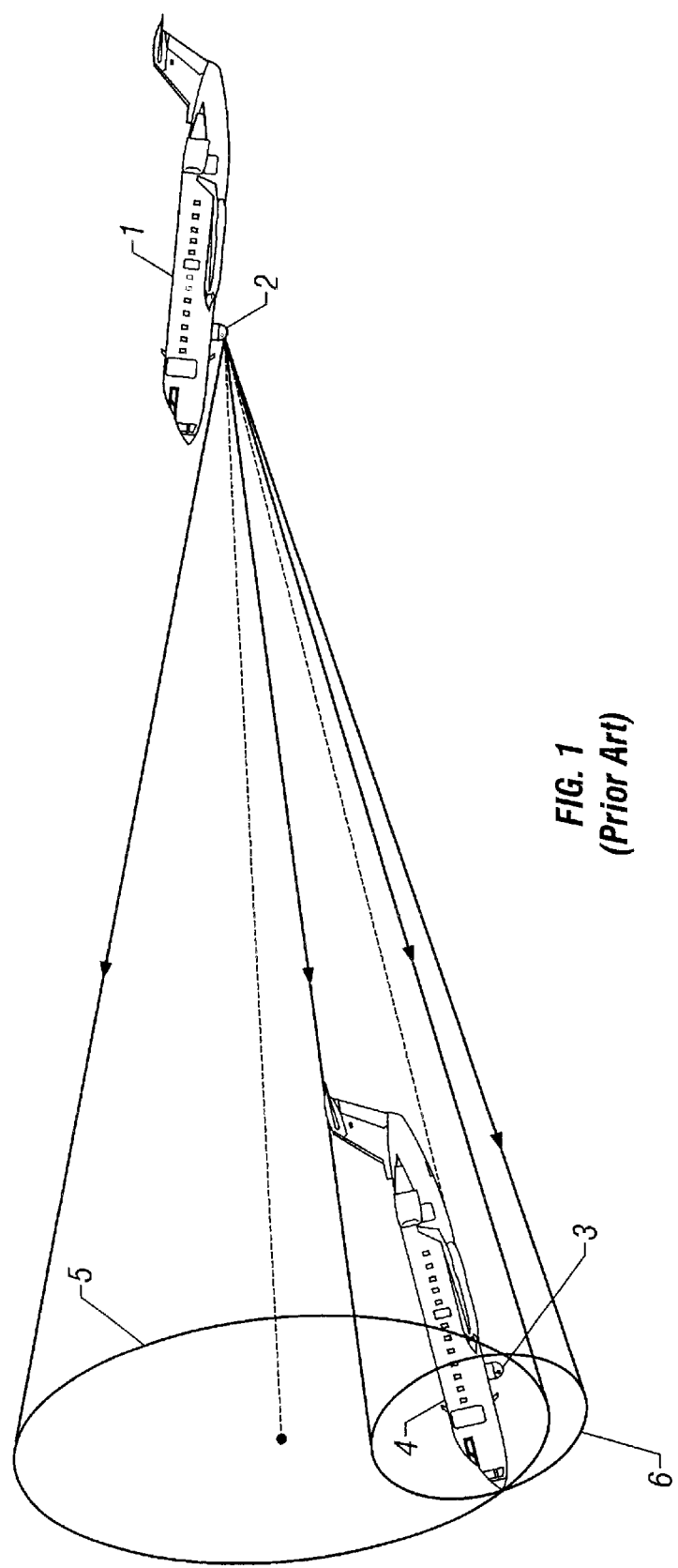
FIG. 1 is a stylized diagram showing two vehicles communicating by means of a free-space laser communication system.
Figure 2:
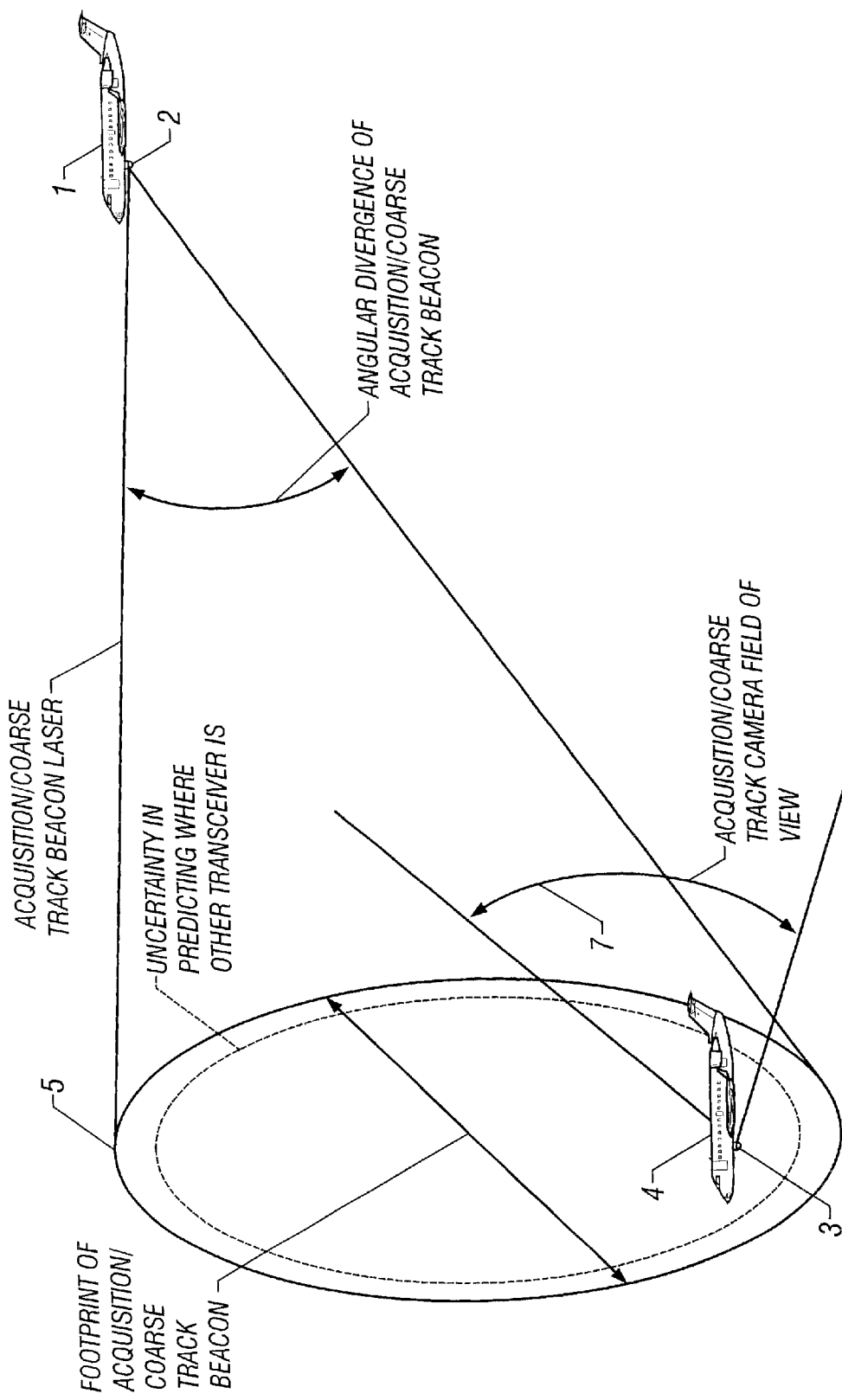
FIG. 2 is a stylized diagram showing the angular field of view (FOV) for the optical apertures of a target laser communication terminal and the angular FOV of the beacon beam from a transmitting host laser communication terminal.
Figure 3:
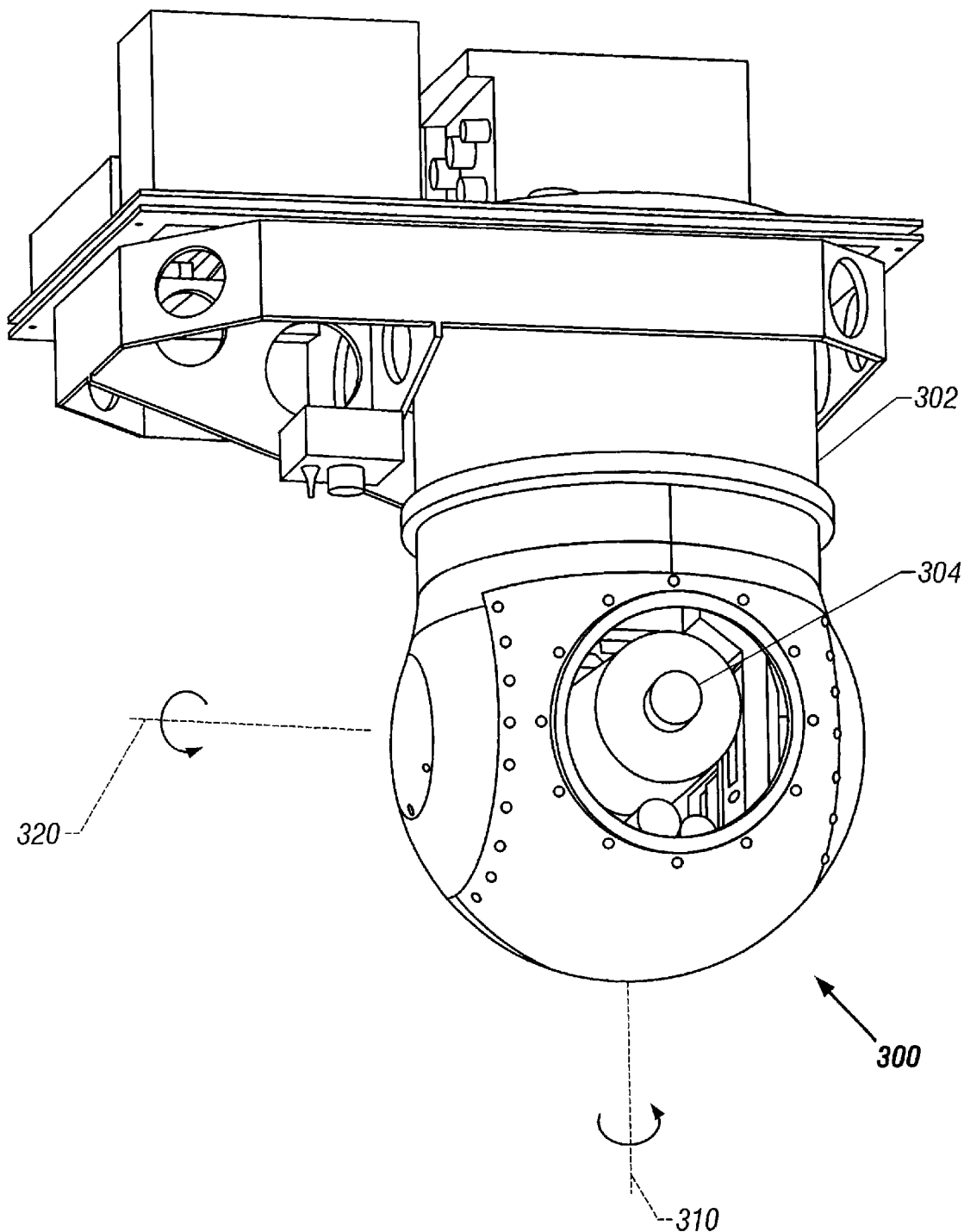
FIG. 3 shows one embodiment of a 2-axis turret for housing a laser communication system in accordance with the invention.

FIG. 3 shows one embodiment of a 2-axis turret 300 for housing a gimbal-mounted laser communication device 304. The turret 300 has a base 302 which is configured with brackets and support structures to be mounted to a base platform or a vehicle, such as the underbody of an airplane. The turret 300 is configured to rotate, at least partially, around at least two axes. In the embodiment shown, the turret 300 may revolve around a first axis 310 for azimuth control and rotate at least partially around a second axis 320 for elevation control. Such a turret can be build based on well-known turrets in the art.

The orientation of the turret 300, i.e., its azimuth and elevation, must be properly pointed to the target before optical tracking and communication can be established. A radio navigation system can be used to control the actuators of the turret 300 so as to direct the turret 300. The global positioning system ("GPS") and an inertial navigation system ("INS") can be implemented to achieve such operation. However, any desired gross pointing system may be used, including a purely optical system. Accordingly, the turret 300 provides a 2-axis mechanism for generally pointing the laser communication device 304 at a target terminal.

Figure 4:
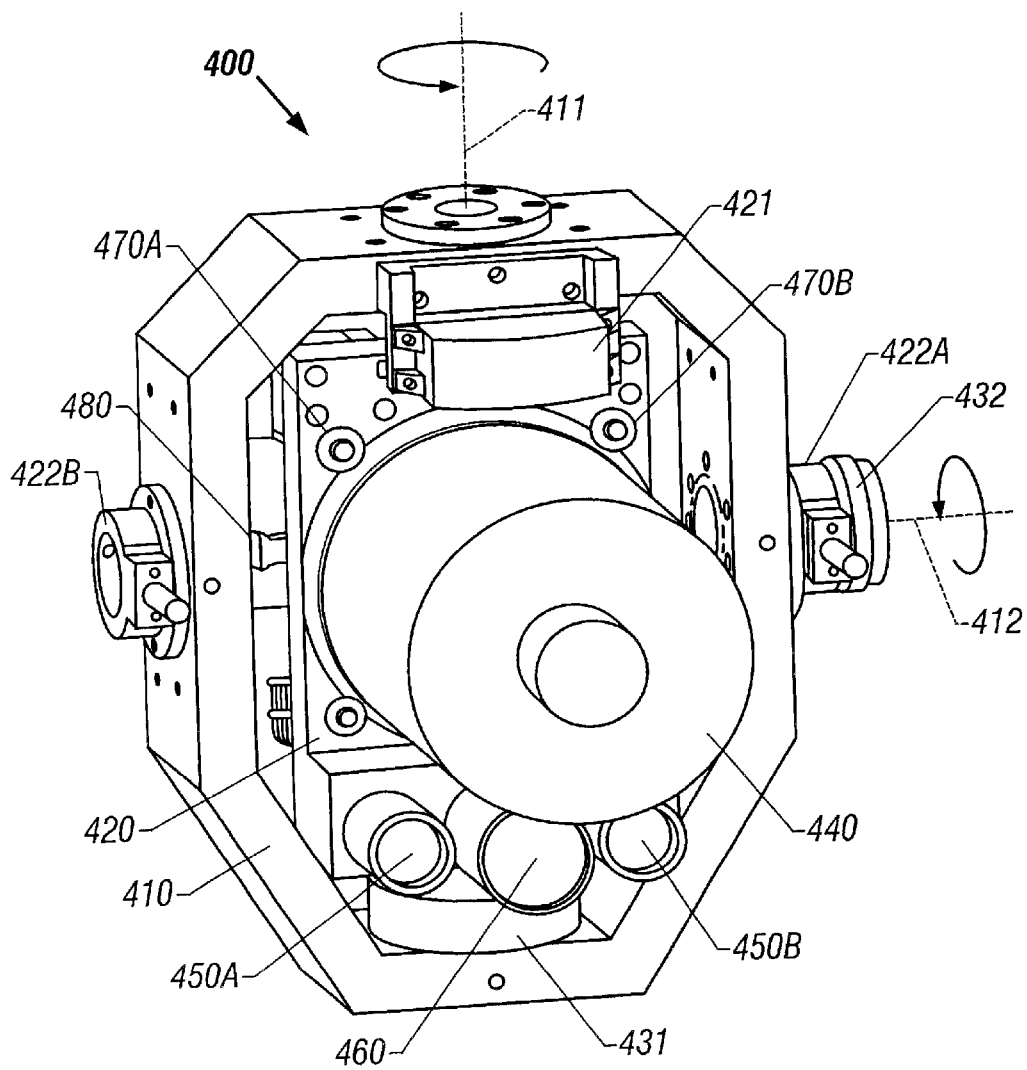
FIG. 4 shows one embodiment of a 2-axis gimbal on which is mounted a laser communication system in accordance with the invention.

FIG. 4 shows one embodiment of a 2-axis gimbal assembly 400. The gimbal assembly 400 includes a rigid gimbal ring 410 as a support member on which all optical apertures integrated on an optical platform 420 of the laser communication device are mounted. The gimbal ring 410 is engaged to the turret 300 of FIG. 3 by two orthogonal axes, an azimuth axis 411 and an elevation axis 412, each with a limited range of rotation (e.g., a degree of freedom of about +/−5°). Hence, the optical platform 420 and the optical apertures thereon can be rotated relative to the turret 300. The gimbal assembly 400 is positioned by an azimuth actuator 421 for rotation around the axis 411 and two elevation actuators 422A, 422B for rotation around the axis 412. Two actuators 422A and 422B are preferably used for rotation around the axis 412 since a sufficiently large torque is needed due to the configuration of the system. The absolute position of the assembly is indicated by an azimuth resolver 431 and an elevation resolver 432. The gimbal assembly 400 is mounted on bearings or flexures to reduce or minimize friction associated with rotation.

Figure 4A:
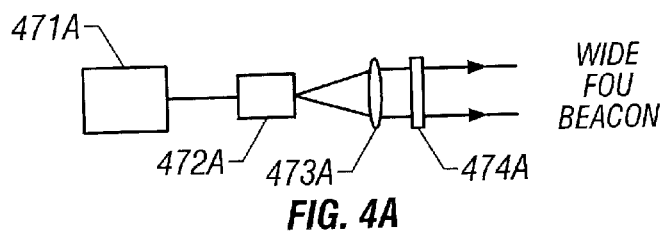
FIGS. 4A and 4B show laser transmitters mounted on the gimbal of FIG. 4 for generating a wide FOV beacon and a narrow FOV beacon, respectively.
Figure 4B:
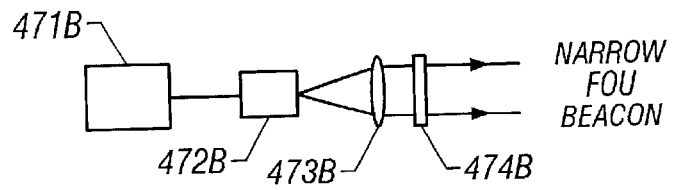

The optical apertures mounted on the optical platform 420 form an optical transceiver that receives tracking and communication beams from and transmits such beams to, another unit. The optical apertures include a telescope receiving aperture 440 for receiving a wide FOV beacon beam and communication laser beams, two communication laser apertures 450A, 450B, a fine tracking aperture 460, two beacon transmitting apertures 470A, 470B, communication receiver detectors (not shown), a viewing camera 480, and two tracking sensors (not shown). The two communication laser apertures 450A and 450B operate to produce two communication beams at a communication frequency to achieve a bandwidth twice of what is possible with a single communication beam. The beacon transmitting apertures 470A and 470B produce the wide FOV beacon and the narrow FOV beacon, respectively, at a beacon frequency that is different from the frequency of the communication beams. FIG. 4A shows one embodiment of the wide FOV beacon transmitting aperture 470A. A laser diode 472A driven by a laser driver circuit 471A produces a linearly-polarized wide FOV beacon. A quarter-wave plate 474A converts the linear polarization into a circular polarization. A lens 473A is used to project the beacon to a target. The beacon transmitting aperture 470B is similarly constructed as shown in FIG. 4B.

The frequencies of these transmitting beams may be stabilized to specified frequencies with narrow linewidths so that very narrow filters can be used to receive light only at these specified frequencies and to reject light at other frequencies for suppressing noise. Such frequency stabilization is particularly important to detection of the wide FOV beacon for coarse tracking since the optical aperture 440 has a large field of view and is significantly exposed to noise such as sky light and other background light. An atomic line filter, such as a cesium vapor cell in a proper external magnetic field, can be used to lock the frequency of the wide FOV beacon and another atomic line filter can be implemented in a respective receiving unit to detect the wide FOV beacon. A semiconductor laser, when used to produce the wide FOV beacon, can also be stabilized by properly controlling the driving current without an atomic line filter. The communication lasers may also be stabilized to achieve certain operation advantages. See, U.S. Pat. Nos. 5,710,652 and 5,801,866, and U.S. patent application Ser. No. 09/123,565, entitled "METHOD AND APPARATUS FOR LOCKING THE WAVELENGTH OF A BEACON BEAM IN A FREE-SPACE LASER COMMUNICATIONS SYSTEM" and filed on Jul. 27, 1998, now U.S. Pat. No. 6,151,340, which are incorporated herein by reference. In addition, each of the transmitted beams may be circularly polarized in order to reduce noise and to separate signals from different beams in detection.

As the actuators 421, 422A, and 422B operate to position the optical platform 420, all of the optical apertures are pointed accordingly. An additional steering element is implemented to provide extra two degrees of movement for the communication laser apertures 450A and 450B and the fine tracking aperture 460. Hence, while other optical apertures have four degrees of movement, the communication laser apertures 450A and 450B and the fine tracking aperture 460 have six degrees of movement and therefore can be adjusted independently with respect to other optical apertures. This additional steering element, as described later, is operable to provide even finer adjustment than the gimbal assembly 400 in a small angle range (e.g., about +/−320 $\mu$radians) at a very high speed in comparison to the motion of the optical platform as a whole.

Figure 5:
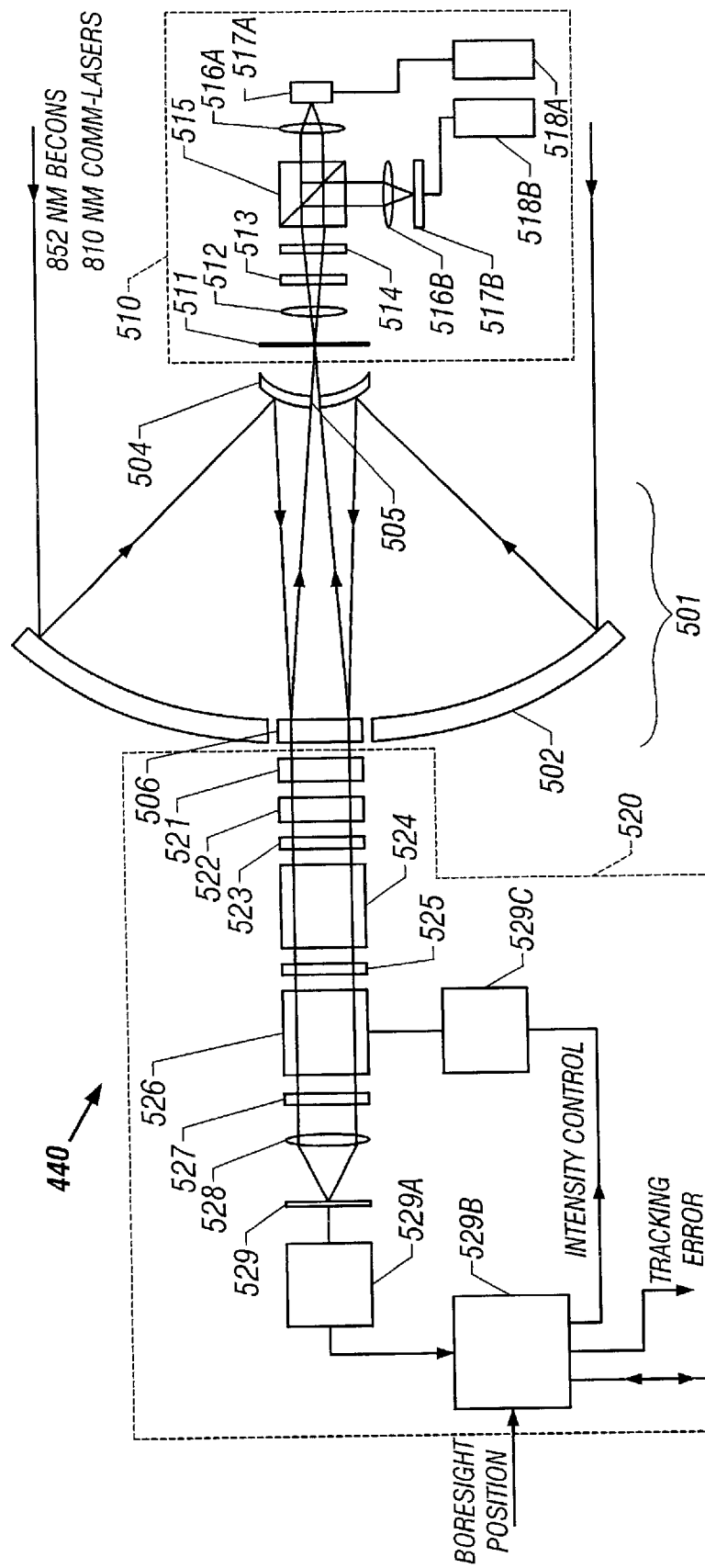
FIG. 5 shows a coarse acquisition and tracking system which may be used in conjunction with the invention.

FIG. 5 is a diagram showing one implementation of the telescope receiving aperture 440. The telescope receiving aperture 440 includes an optical receiving unit 501, a data detection module 510, and a coarse tracking module 520. The optical receiving unit 501 has a primary concave spherical mirror 502, a secondary convex spherical mirror 504 and a dichroic optical filter 506 located in an opening in the center of the mirror 502. The mirrors 502 and 504 are positioned relative to each other to receive and direct beacon beams (both wide FOV beacon and narrow FOV beacon) and communication beams from another laser communication device to the optical filter 506. The optical filter 506 transmits light at the beacon frequency to the coarse tracking module 520 located on the other side of the mirror 502 and reflects light at the communication frequency to the mirror 504. An opening 505 is formed in the center of the mirror 504 to allow the communication beams to focus to the data detection module 510 on the other side of the mirror 504.

Two communication beams from another laser communication device are preferably right-hand circularly polarized and left-hand circularly polarized, respectively, in order to reduce any interference therebetween since they are at the same communication frequency. The data detection module 510 is configured to separately detect the two cross-polarized communication beams. Specifically, the detection module 510 includes a spatial filter 511 (e.g., a pinhole) at or near the focal point of the communication beams, a lens 512, a narrow bandpass filter 513, a quarter-wave plate 514, a polarizing beam splitter 515, lenses 516A, 516B, and detectors 517A, 517B. The spatial filter 511 limits the field of view and the direction of light that can be received at the detectors 517A and 517B. The narrow bandpass filter 513 has a center transmission frequency at the communication frequency and a bandwidth (e.g., +/−3 nm) to further restrict the frequency of light that can be received by the detectors 517A and 517B for improving the signal-to-noise ratio of the signal detection. The quarter-wave plate 514 converts the cross circularly polarized communication beams into two linearly polarized beams that are mutually orthogonal. The polarizing beam splitter 515 separates and directs the two communication beams to the detectors 517A and 517B, respectively. The detection module 510 further includes two signal amplifiers 518A and 518B that are respectively connected to the detectors 517A and 517B to amplify the received signals.

The coarse tracking module 520 has a narrow bandpass filter 521, a quarter-wave plate 522, an atomic line filter formed of a polarizer 523, an atomic vapor cell 524, and a polarizer 525, an intensity control unit formed of the polarizer 525, an electrical-controllable birefringent retarder 526, and a polarizer 527, an imaging lens 528, and an imaging sensing array 529 (e.g., CCD). The narrow bandpass filter 521 can be an interference filter and operate to limit the frequency of the transmitted light that passes through the filter 506. The quarter-wave plate 522 converts circularly polarized beam into a linearly polarized beam. The polarizer 523 selects a beam of a desired polarization for detection by the sensing array 529. The wide FOV beacon, for example, can be cross polarized with the narrow FOV beacon. Hence, these two beacon beams remain cross polarized after being converted from circular polarizations into linear polarizations by the quarter-wave plate 522. The polarizer 523 can be orientated to select the wide FOV beacon for coarse tracking.

The atomic line filter is further used to select the wide FOV beacon at a selected atomic transition wavelength and reject other light. The wide and narrow FOV beacons can be produced at two beacon frequencies that are slightly different from each other by such a small frequency separation that the dichroic filter 506 and the narrow pass band filter 521 could not provide them. This can be achieved by using two single-mode diode lasers to respectively produce the beacon beams. The atomic line filter, however, can separate such a small frequency separation by transmitting one frequency while rejecting another using a sharp transition of the vapor in the vapor cell 524. This filtering further reduces background noise and improves the precision of the coarse tracking.

For example, the communication beams can be at about 810 nm and the two beacon beams can be at about 852 nm. The dichroic filter 506 separates the two different wavelengths by reflecting the 810 nm and transmitting the 852 nm. Cesium vapor can be used in the vapor cell 524 to select the wide FOV beacon at a cesium transition (e.g., 852.34 nm).

The intensity received by the sensing array 529 can be adjusted by using the intensity control unit formed of the polarizer 525, an electrical-controllable birefringent retarder 526, and a polarizer 527. Since the dynamic range of the sensing array 529 is limited, this adjustment of the received intensity allows the system to operate in a wide range of received intensity ranges and thereby extends the range of communication between two laser communication devices. A control feedback loop formed of a signal-receiving circuit 529A, a signal processor 529B, and a retarder controller 529C is used to achieve this. The retarder 526 may be formed of a liquid crystal material as disclosed in U.S. patent application Ser. No. 09/033,567, filed on May 22, 1998, which is incorporated herein by reference.

The sensing array 529 converts the photons into pixelated electrons which are processed by the circuit 529A. The processor 529B calculates a centroid of the focused wide FOV beacon. This centroid gives the location of the focused energy on the sensing array 529. The processor 529B also calculates the signal amplitude level and adjusts the voltage on the variable retarder 526 via the circuit 529C to keep the received beacon signal within the dynamic range of the sensing array 529.

The processor 529B receives an input reference signal which represents the boresight position of the light signal onto the sensing array 529. The deviation of the calculated position or centroid position of the incoming light signal from the boresight position is determined and indicates the tracking error. This tracking error is applied to the two-axis gimbal 400 shown in FIG. 4 to command the azimuth and elevation actuators which align the optical platform 420 so that the focused spot of the incoming wide FOV beacon overlaps the boresight position on the sensing array 529.

The accuracy of the coarse tracking is typically limited to approximately one-tenth the field-of-view of a pixel in the sensing array 529. For example, if the sensing array 529 is an array of 256×256 sensing pixels and has an FOV of about 20.48 milliradians, each pixel will have an instantaneous FOV of about 80 microradians. The sensing array 529 will then have an accuracy of approximately 8 microradians. Therefore, once the focused point of the wide FOV beacon is locked to the boresight, the target will be tracked to about an 8 microradian rms (root mean square) error.

This pointing accuracy may be acceptable for some applications. However, factors other than pointing accuracy must be taken into account for a laser communication system designed for long range (e.g., 500 km) and high data rates (e.g., >1 GBPS) and with one or both terminals mounted on moving platforms. For example, the turret 300 directly responds to base motion. In the preferred embodiment, such base motion is stabilized for the gimbal 400 by a stabilization system which uses a rate sensor (2-axis gyro). However, the bandwidth of this system is limited by the sensor bandwidth, gimbal mechanical inertia, and gimbal and mount compliances. In the illustrated embodiment, the mechanical systems being stabilized have inertias and mechanical compliances which typically give maximum gimbal mount servo stabilization frequencies below 100 Hz. Typical platforms for aircraft, satellites and ground based vehicles have angular vibrations which exceed 1 KHz. Such high frequency angular base motion disturbances will translate to increased errors in the communication data rate. For systems requiring small transmitter beam divergences, the pointing and tracking servo must have a larger bandwidth than can be achieved by stabilizing against base motion using a gimbal-based servo.

This desirable high frequency stabilization mechanism can be achieved by a fine tracking system to track the narrow FOV beacon from another laser communication device. This fine tracking system implements a single pivoting element with a low inertia to provide two axes of rotation at a high response speed for the optical apertures 450A, 450B, and 460, without affecting the position of the optical platform. This pivoting element of two axes of rotation is in addition to the two axes of rotation from the turret 300 of FIG. 3 and two axes of rotation from the gimbal 400 of FIG. 4. Hence, the optical apertures 450A, 450B, and 460 have a total of six axes of rotation while other elements have four axes of rotation.

Figure 6:
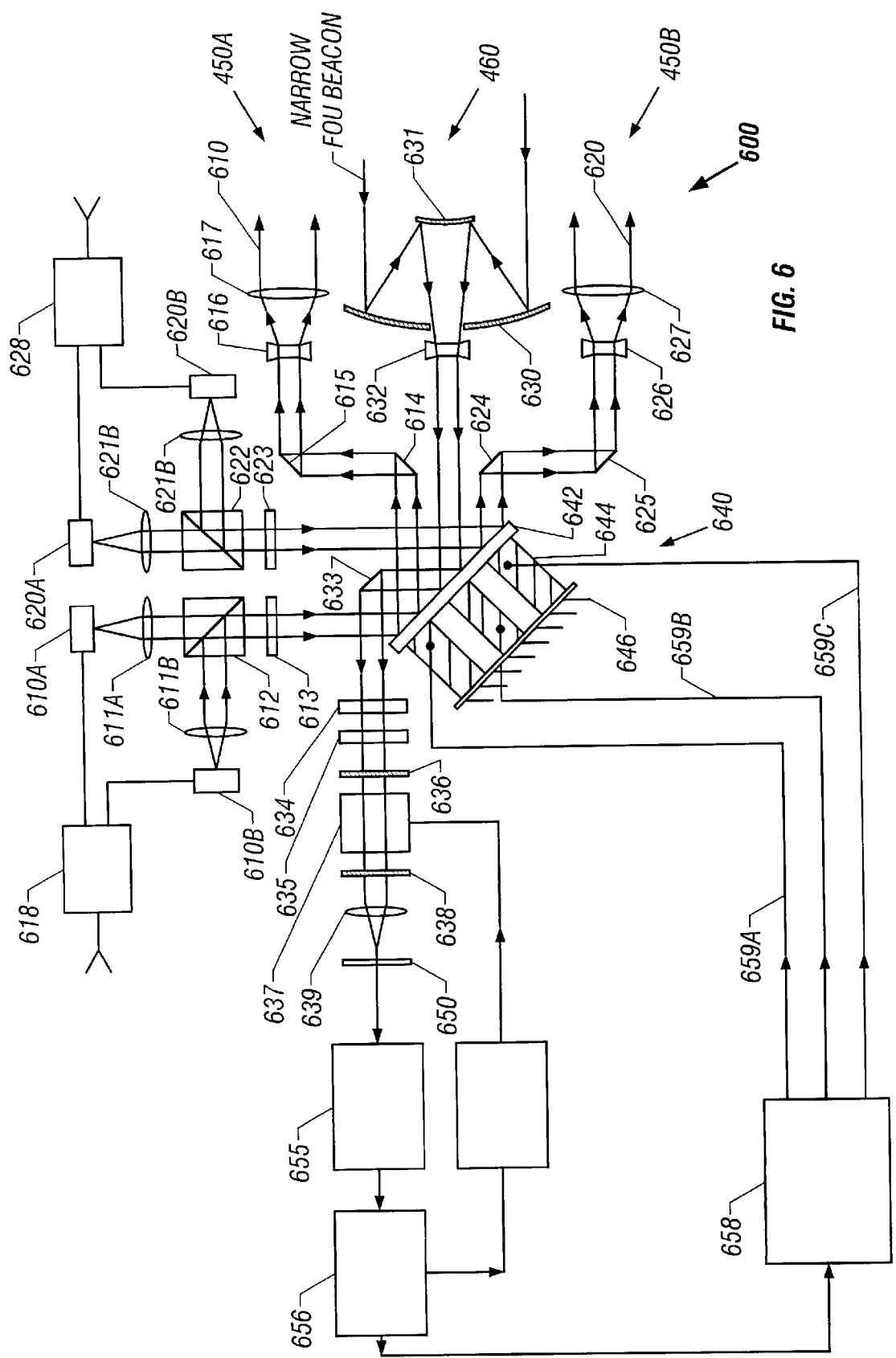
FIG. 6 shows one embodiment of a fine acquisition and tracking system in accordance with the invention.

FIG. 6 shows one embodiment 600 of the fine tracking system and communication laser transmitters which are respectively indicated as optical apertures 460, 450A, and 450B in FIG. 4. The first communication laser transmitter 450A includes two laser diodes 610A and 610B to collectively produce the first communication laser beam. The two beams from the two laser diodes 610A and 610B are respectively collimated by lenses 611A and 611B and combined by a polarizing prism combiner 612 as the linearly-polarized first communication beam. A diode laser control circuit 618 is used to control the laser diodes 610A and 610B and to imprint communication data on the laser beams. A quarter-wave plate 613 converts the first communication beam into a circularly polarized beam 610. A pivoting mirror 640 receives the first communication beam 610 and directs to mirrors 614 and 615. Projecting lenses 616 and 617 further direct the beam 610 to another laser communication device. The second communication laser transmitter 450B is similarly constructed as shown and is also steered by the same pivoting mirror 640 except that the second communication laser beam 620 is cross polarized with respect to the first communication laser beam 610. This polarization arrangement allows separate detection of the two communication laser beams and doubles the transmission bandwidth. The transmitters 450A and 450B are aligned with respect to the pivoting mirror 640 in such a way that the two communication laser beams 610 and 620 are substantially parallel to each other.

The fine tracking aperture 460 receives a distant narrow FOV beacon signal which is circularly polarized and at a desired wavelength (e.g., at 852 nm) by a conventional telescope with primary concave mirror 630 and a secondary convex mirror 631. A focusing optics 632 collimates the received beacon beam into a beam of a reduced diameter and directs the beacon beam to the pivoting mirror 640. A mirror 633 further guides the beacon beam from the pivoting mirror 640 to a fine tracking detection module. The detection module includes a narrow bandpass filter 634 which transmits the desired wavelength and rejects others, a quarter-wave plate 635 which converts the circular polarization into a linear polarization, a first linear polarizer 636, an electrically-controllable retarder 637, a second linear polarizer 638, a focusing lens 639, and a sensing array 650. The first linear polarizer 636, the retarder 637, and the second linear polarizer 638 form an electrically controllable optical attenuator which adjusts the intensity of the received beacon within a dynamic range of the sensing array 650.

The signal received on the sensing array 650 is amplified by sensor electronics 655 and is further processed by a processor 656 to generate the centroidal position of the focused spot on the sensing array 650. The position of the focused spot on the sensing array 650 provides the angular information of the received narrow FOV beacon. The processor 656 compares the centroidal position with a predetermined boresight position of the optical system to generate a tracking error signal which indicates the direction and amount of deviation of centroidal position from the boresight position. A steering mirror driver amplifier 658 responds to the tracking error signal to drive the pivoting mirror 640 so as to reduce the tracking error by moving the centroidal position close to the boresight position. Similar to the coarse tracking system shown in FIG. 5, this locks the centroidal position to boresight position.

The sensing array 650 is configured to have fewer number of pixels than the sensing array 529 in the coarse tracking shown in FIG. 5 in order to read out in a time shorter than the readout time of the sensing array 529. In addition, the sensing array 650 can provide higher tracking accuracy than the sensing array 529. For example, the sensing array 650 may be a 32×32 CCD array while sensing array 529 may be a 256×256 CCD array. The readout speed of the 32×32 array 650 is faster than that of the 256×256 array 529 by a factor of about 180. Hence, the small sensing array 650 allows for correction of tracking errors of high frequencies beyond the capability of the large sensing array 529 and thereby extends the bandwidth of the tracking accuracy. The sensing array 529 may provide an accuracy of approximately 8 microradians, the accuracy of the sensing array 650 may be about 2 microradian.

One feature of the fine tracking system is the high response speed. This is in part due to the construction of the pivoting mirror 640. The pivoting mirror 640 has a reflector 642 and two or more electrical actuators 644. The actuators 644 are engaged to a support base 646 which is fixed to the optical platform 420. The reflector 642 is pivotally coupled to the actuators 644 so as to rotate about two axes. FIG. 6 shows one embodiment which uses three piezo actuators to support and control the reflector 642. The control signal produced by the driver amplifier 658 (e.g., 659A, 659B, and 659C) adjusts the voltages on the piezo actuators to steer the reflector 642 so that centroidal position moves towards the predetermined boresight position. The reflector 642 can be configured to be light weight and to achieve a high steering speed. A steering speed up to and greater than 1 KHz can be achieved by using the piezo actuators 644 and to correct alignment errors caused by high frequency angular disturbances of the base motion. The steering angular range of the reflector 642 preferably covers at least the field of view of the sensing array 650 and may be bigger to allow for tolerance of alignment errors. For example, if the field of view of the sensing array 650 is 640 $\mu$radians, the steering angular range of the reflector 642 may be set about 900 $\mu$radians.

Another feature of the fine tracking system is that all three optical apertures, 450A, 450B, and 460 are controlled by the same pivoting mirror 640. The optical apertures 450A, 450B, and 460 are arranged relative to the mirror 640 so that the two communication laser beams become parallel to the direction of the received beacon beam incident to the reflector 642 when the centroidal position on the sensing array 650 produced by the received beacon beam overlaps the predetermined boresight position. For example, all three apertures may be co-aligned within a small fraction (e.g., 5 $\mu$radians) of the angular beam divergence (e.g., 35 $\mu$radians) of the communication lasers. Hence, the proper aiming of the communication laser beams at another laser communication device is automatically completed when the fine tracking error is maintained below a desired tolerance level.

In addition, the optical apertures 450A, 450B, and 460 are arranged to spatially separate the footprints of the two communication laser beams and the beacon beam from one another to eliminate interference between any two beams at the sensing array 650.

In one implementation, the communication lasers of each laser communication terminal had a beam divergence angle of about 35 microradian (full width half maximum power), requiring an overall pointing accuracy of approximately 7 microradians rms. With this accuracy, the receiving aperture will receive a signal of greater than half the maximum power density most of the time. This pointing accuracy includes pointing errors from the centroider accuracy, fixed misalignment between the communication lasers, fixed misalignment between the communication laser and centroider imaging sensor, and the control loop positioning accuracy.

A number of embodiments of the present invention have been described. Nevertheless, it will be understood that various modifications may be made without departing from the spirit and scope of the invention. For example, the steering mirror 640 shown in FIG. 6 may be pointed by different types of actuators. Accordingly, other embodiments are within the scope of the following claims.

What is claimed is:

1. A free-space laser communication system having six axes of movement, comprising:
   (a) a housing having two axes of movement;
   (b) a gimbal mounted within the housing, the gimbal having two axes of movement;
   (c) an optical transceiver mounted on the gimbal and configured to include:
      (1) a centroiding system operating to determine an aiming point for the optical transceiver;
      (2) at least one communication laser operable to generate an output laser beam to be directed at the aiming point;
      (3) a steering mirror having two axes of movement, operable to direct an incoming beacon beam to the centroiding system and the output laser beam to the aiming point; and
      (4) a feedback control receiving information on the aiming point from the centroiding system and adjusting the steering mirror to direct the output laser beam at the aiming point according to the information.

2. The system of claim 1, further including an optical acquisition and tracking system for aiming the gimbal.

3. A fine acquisition and tracking system for a free_space laser communication system, comprising:
   A. a centroiding system operating to determine an aiming point for the free_space laser communication system;
   B. at least one communication laser operable to generate an output laser beam to be directed at the aiming point;
   C. a steering mirror disposed relative to the centroiding system and the communication laser and configured to direct an incoming beacon beam to the centroiding system and the output laser beam to the aiming point; and
   D. a feedback control receiving information on the aiming point from the centroiding system and adjusting the steering mirror to direct the output laser beam at the aiming point according to the information.

4. The system of claim 3, wherein the steering mirror has two axes of movement.

5. The system of claims 1 or 3, wherein the steering mirror is steered by piezoelectric actuators.

6. The system of claims 1 or 3, wherein the path of the incoming beacon beam is spatially displaced from the path of the output laser beam at the steering mirror so that the incoming beacon beam and the output laser beam form separate footprints on the steering mirror.

7. A method for fine acquisition and tracking of a beacon beam and aiming of at least one communication laser in a free-space laser communication system, comprising:
   (a) using a steering mirror to direct an incoming beacon beam to a centroiding system;
   (b) using the centroiding system to determine an aiming point for the free-space laser communication system; and
   (c) adjusting the steering mirror to direct an output beam at the aiming point determined by the centroiding system.

8. The method of claim 7, further including adjusting the steering mirror with respect to six axes of movement to direct the output beam at the aiming point.

9. A laser communication device for free-space communication with another laser communication device, comprising:

(a) a first adjustable mount engaged to a base unit and operable to rotate about two axes of movement with respect to the base unit;

(b) a second adjustable mount engaged to the first adjustable mount and operable to rotate about two axes of movement with respect to the first adjustable mount;

(c) at least one communication laser fixed to the second adjustable mount and configured to produce an output communication laser beam that is modulated to carry information;

(d) two tracking lasers fixed to the second adjustable mount and configured to produce a first output tracking beam and a second output tracking beam of different fields of view;

(e) a first sensing array fixed to the second adjustable mount and configured to receive a first incoming tracking laser beam from another laser communication device and to produce a first electrical signal to indicate a first tracking beam position of the first incoming tracking laser beam on the first sensing array;

(f) a first tracking circuit connected to the first sensing array to receive the first electrical signal, the first tracking circuit comparing the first tracking beam position to a predetermined first boresight position on the first sensing array to produce a first tracking signal which indicates a deviation of the first tracking beam position from the first boresight position; and (g) a steering mirror engaged to rotate about two axes of movement with respect to the second adjustable mount and located to direct the first incoming tracking laser beam to the first sensing array and direct the output communication laser beam to the other laser communication device, thereby providing six degrees of movement in directions of the first incoming tracking laser beam and the output communication laser beam relative to the base unit, wherein the steering mirror is configured to respond to the first tracking signal and reorientate to move the first tracking beam position towards the first boresight position on the first sensing array, thereby directing the output communication laser beam to the other laser communication device.

10. The device of claim 9, wherein the steering mirror is steered by at least one piezoelectric actuator that engages the steering mirror to the second adjustable mount.

11. The device of claim 9, wherein the first sensing array includes a CCD array.

12. The device of claim 9, further comprising an adjustable beam attenuator disposed in the optical path of the first incoming tracking beam between the first sensing array and the steering mirror, wherein the beam attenuator adjusts an intensity of the first incoming tracking beam received by the first sensing array to limit the intensity within a specified intensity range of the first sensing array.

13. The device of claim 12, wherein the adjustable beam attenuator includes an electrically controllable birefringent element.

14. The device of claim 9, further comprising a bandpass optical filter disposed in the optical path of the first incoming tracking beam between the first sensing array and the steering mirror, wherein the bandpass optical filter transmits light of a specified wavelength to the first sensing array and rejects light at other wavelengths.

15. The device of claim 9, further comprising a quarter-wave plate fixed to the second adjustable mount relative to each of the communication laser and the two tracking lasers to make the output communication laser beam, the first and second output tracking beams circularly polarized.

16. The device of claim 9, further comprising:

(1) an optical receiving aperture fixed to the second adjustable mount to receive at least one incoming communication laser beam from the other laser communication device;

(2) a second sensing array fixed to the second adjustable mount and configured to receive a second incoming tracking laser beam from another laser communication device and to produce a second electrical signal to indicate a second tracking beam position of the second incoming tracking laser beam on the second sensing array;

(3) a second tracking circuit connected to the second sensing array to receive the second electrical signal, the second tracking circuit comparing the second tracking beam position to a predetermined second boresight position on the second sensing array to produce a second tracking signal which indicates a deviation of the second tracking beam position from the second boresight position;

wherein the second adjustable mount is configured to respond to the second tracking signal and reorientate to move the second tracking beam position towards the second boresight position, thereby directing the optical receiving aperture at the other laser communication device.

17. The device of claim 16, wherein the second sensing array includes a CCD array.

18. The device of claim 16, further comprising an adjustable beam attenuator disposed in the optical path of the second incoming tracking beam, wherein the beam attenuator adjusts an intensity of the second incoming tracking beam received by the second sensing array to limit the intensity within a specified intensity range of the second sensing array.

19. The device of claim 18, wherein the adjustable beam attenuator includes an electrically controllable birefringent element.

20. The device of claim 16, further comprising a bandpass optical filter disposed in the optical path of the second incoming tracking beam, wherein the bandpass optical filter transmits light of a specified wavelength to the second sensing array and rejects light at other wavelengths.

21. The device of claim 20, wherein the bandpass optical filter includes an atomic vapor cell and the specified wavelength is determined by a wavelength of a selected atomic transition.

22. The device of claim 16, further comprising:

(A) a first optical element fixed to the second adjustable mount relative to the first sensing array to couple the first incoming tracking beam from the other laser communication device to the first sensing array at a first field of view; and (B) a second optical element fixed to the second adjustable mount relative to the second sensing array to couple the second incoming tracking beam from the other laser communication device to the second sensing array at a second field of view, wherein the first field of view for the first sensing array is smaller than the second field of view for the second sensing array.

23. The device of claim 22, wherein at least one of the first and second optical elements includes one convex spherical reflector and one concave spherical reflector that are positioned relative to each other to form a telescope.

24. The device of claim 22, wherein the first sensing array has fewer number of sensing pixels than the second sensing array.

25. The device of claim 9, further comprising at least one tracking beam laser fixed to the second adjustable mount and configured to produce an output tracking beam which has a wavelength different from a wavelength of the output communication laser beam.

26. The device of claim 9, further comprising a navigation system operable to determine a relative position of the other laser communication device with respect to the base unit, wherein the navigation system controls orientation of the first adjustable mount according to the relative position.

27. The device of claim 26, wherein the navigation system includes at least a GPS unit or an INS unit.

* * * * *